United States Patent [19]

Goren et al.

[11] Patent Number: 4,653,605
[45] Date of Patent: Mar. 31, 1987

[54] THEFT PREVENTION APPARATUS

[75] Inventors: Amos Goren, Rehovot; Yehuda Zucker, Rishon Le Zion, both of Israel

[73] Assignee: Zuck-OR, Ltd., Rishon Le Zion, Israel

[21] Appl. No.: 798,802

[22] Filed: Nov. 15, 1985

[30] Foreign Application Priority Data

Nov. 21, 1984 [IL] Israel .................................. 73589

[51] Int. Cl.⁴ .............................................. B60R 25/04
[52] U.S. Cl. ................................ 180/287; 307/10 AT; 340/64
[58] Field of Search ................ 180/287; 340/64, 53; 307/10 AT

[56] References Cited

U.S. PATENT DOCUMENTS

| 4,288,778 | 9/1981 | Zucker | 180/287 |
| 4,332,306 | 6/1982 | Turatbi | 180/287 |
| 4,347,545 | 8/1982 | Weishaupt et al. | 180/287 |
| 4,449,605 | 5/1984 | Read | 180/287 |
| 4,452,197 | 6/1984 | Weber | 180/287 |
| 4,463,340 | 7/1984 | Adkins et al. | 180/287 |
| 4,549,090 | 10/1985 | Read | 180/287 |
| 4,553,511 | 11/1985 | Hayakawa et al. | 180/287 |

Primary Examiner—Richard A. Bertsch
Attorney, Agent, or Firm—Cushman, Darby & Cushman

[57] ABSTRACT

Electronic theft prevention apparatus for vehicles including an engine containing spark plugs for providing ignition, a high voltage source and a distributor having a central contact for providing high voltage distribution to the spark plugs, the apparatus including; decoder apparatus disposed within a protective housing enclosing the central contact, encoder apparatus accessible to a vehicle operator for providing coded instructions to the decoder, data coupling apparatus for interconnecting the decoder apparatus and the encoder apparatus to permit data transfer therebetween, whereby application of constant battery voltage to the data coupling apparatus is not effective to operate the decoder, and switching apparatus located within the protective enclosure, operated by the decoder and governing the supply of a high voltage input to the central contact, thus selectably preventing high voltage distribution to the sparkplugs.

8 Claims, 2 Drawing Figures

THEFT PREVENTION APPARATUS

FIELD OF THE INVENTION

The present invention relates to theft prevention apparatus generally, and more particularly to electronic theft prevention devices providing ignition inhibition.

BACKGROUND OF THE INVENTION

Various electronic theft prevention devices providing ignition inhibition are known in the prior art. A particularly successful device of this type, developed by the present applicant/assignee, is shown and described in U.S. Pat. No. 4,288,778. This device and other prior art devices operate on the low voltage side of the ignition system.

Recently self-contained continuous very high voltage generators have become commercially available. These devices make it practical to effectively bypass all antitheft devices operating on the low voltage side of ignition systems, by supplying a continuous high voltage pulse train to the center contact of the distributor cap. Although the resulting engine performance is poor, a vehicle can be started and moved, by means of provision of such a pulse train.

SUMMARY OF THE INVENTION

The present invention seeks to provide electronic theft prevention apparatus which overcomes the disadvantages of the prior art devices and which is immune to bypass through the use of continuous pulse train generators.

There is thus provided in accordance with a preferred embodiment of the present invention, electronic theft prevention apparatus for vehicles including an engine containing spark plugs for providing ignition, a high voltage source and a distributor having a central contact for providing high voltage distribution to the spark plugs, the apparatus including decoder apparatus disposed within a protective housing enclosing the central contact;

encoder apparatus accessible to a vehicle operator for providing coded instructions to the decoder;

data coupling apparatus for interconnecting the decoder apparatus and the encoder apparatus to permit data transfer therebetween, whereby application of constant battery voltage to the data coupling apparatus is not effective to operate the decoder; and switching apparatus located within the protective enclosure, operated by the decoder and governing the supply of a high voltage input to the central contact, thus selectably preventing high voltage distribution to the sparkplugs.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
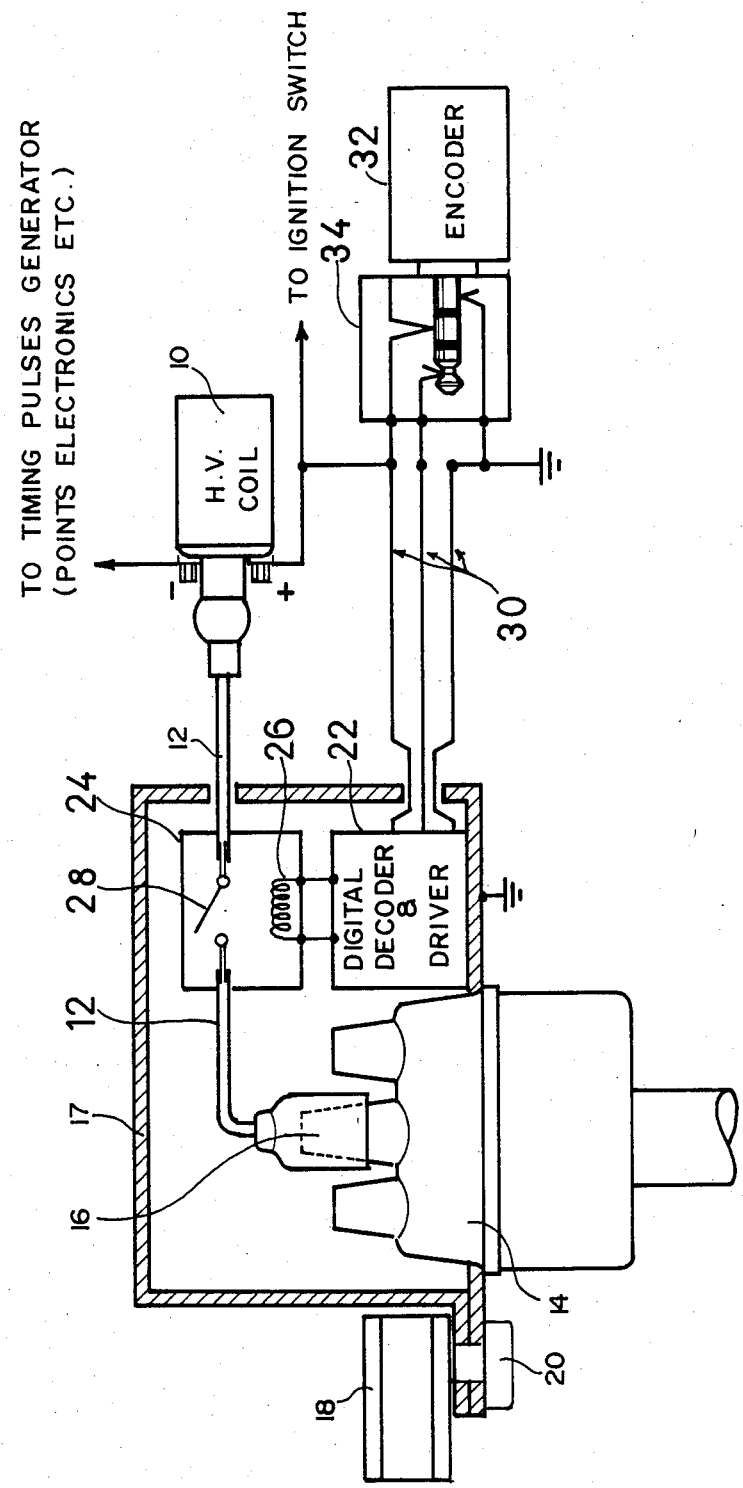
FIG. 1 is a partially pictorial, partially block diagram illustration of theft prevention apparatus constructed and operative in accordance with a preferred embodiment of the present invention.

Reference is now made to FIG. 1 which illustrates the theft prevention apparatus of the present invention in the context of an ordinary motor vehicle ignition system including an ignition coil 10, a high voltage cable 12, and a distributor 14, whose central contact 16 is coupled to the high voltage cable 12.

A tamper resistant protective enclosure 17 is provided in accordance with a preferred embodiment of the invention is locked in place over the distributor cap portion of the distributor 14, any other suitable part thereof or the entire distributor, typically by means of a padlock 18 having a cooperating locking pin 20. Enclosure 17 is preferably formed of hardened steel or any other suitable material and may be coupled to the vehicle ground.

Disposed within protective enclosure 17 is a digital decoder and driver 22, which may be identical to the decoder and driver apparatus illustrated and described in the aforesaid U.S. Pat. No. 4,288,778, which is incorporated herein by reference. In practice, the decoder and driver 22 is programmed to respond to only one digital code out of $2^N$ possibilities, where N is the number of bits in the code.

Digital decoder and driver 22 operates a high voltage switch 24, which is also disposed within protective enclosure 17, and which is operative to govern the supply of high voltage from coil 10 to the central contact 16 of the distributor. Switch 24 includes a solenoid 26, which is energized by decoder and driver 22 and a relay switch 28, operated by the solenoid. Switch 28 is normally open except when the solenoid is energized. When switch 28 is open it is impossible to start the motor vehicle which depends on the high voltage supply from coil 10.

A code signal and operating power is supplied to digital decoder and driver 22, typically via a three conductor cable 30. Normally a code employing at least 15 bits is employed such that overcoming the protective device by breaking the code is impractical in that it would be too time consuming. Overcoming the protective device by physical means is also impractical, since the keys to the padlock are retained by the vehicle owner and the padlock is situated so as to be difficult to break without damaging vital vehicle components.

The required code signal is provided to decoder 22 by means of an encoder 32. Normally the encoder may be in the form of a small pocket held plug, which when inserted into a mating socket 34, is connected to a power source such as a vehicle battery (not shown) and to the decoder. The encoder may be of the type described in the aforesaid U.S. Pat. No. 4,288,778.

Alternatively, the encoder may comprise a vehicle mounted or driver carried keyboard, such as used in small calculators, such that the code is operator entered.

The decoder 22 may be connected to an audible alarm (not shown) such that entry of an incorrect code or failure to enter a correct code within a predetermined time following opening of the car doors results in sounding of an alarm.

Figure 2:
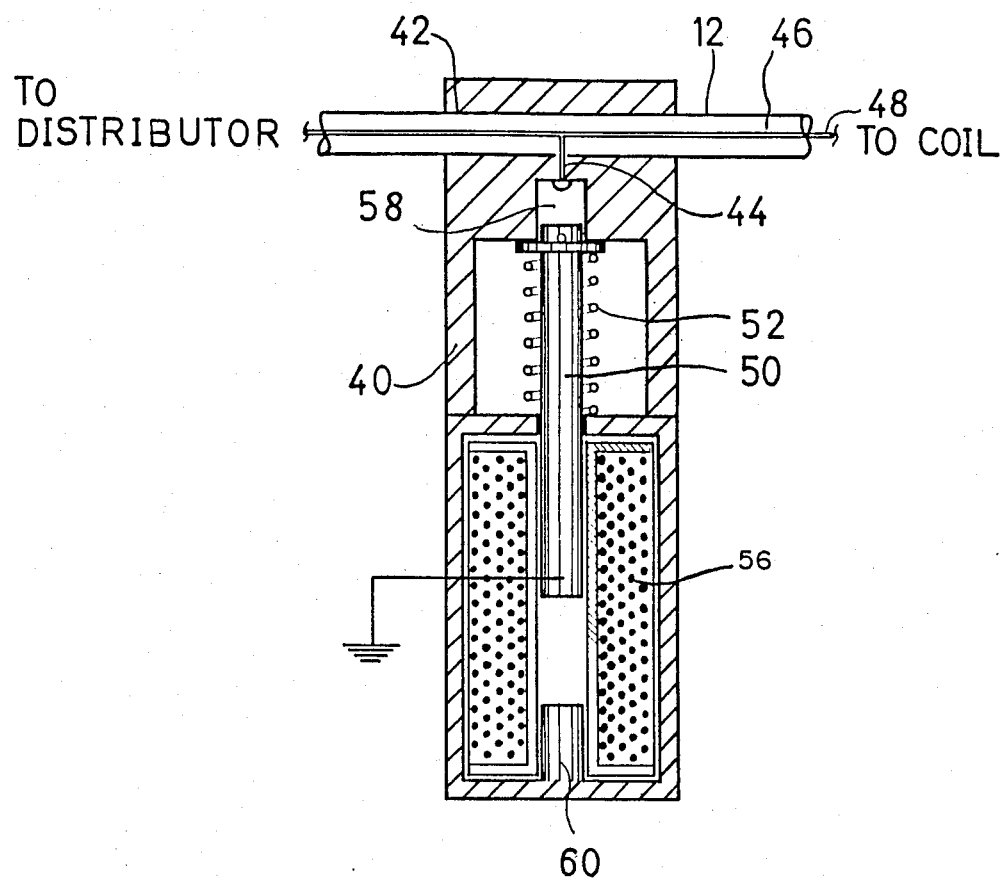
FIG. 2 is a sectional illustration of an embodiment of a high-voltage switch useful in the embodiment of FIG. 1.

Reference is now made to FIG. 2 which illustrates a preferred embodiment of high voltages switch 24. The switch of FIG. 2 comprises an insulative housing 40 having a bore 42 formed therein through which extends a conventional high voltage cable 12. A piercing nail-type contact 44 penetrates the insulation 46 of cable 12 and establishes electrical contact with the high voltage carrying conductor 48 surrounded thereby. A grounded, soft iron plunger 50, which is associated with a positioning spring 52, has two operating positions. When the windings 56 of solenoid 26 are not energized, the plunger is positioned in a first position relative to contact 44, defining a first air gap 58 therebetween. This gap distance is chosen such that its breakdown voltage is lower than that needed to produce a spark across the electrodes of the spark plugs of the vehicle. Thus, when solenoid 26 is not energized, the high voltage supply is shunted to ground.

When the windings 56 of the solenoid 26 are energized, the plunger is attracted to a pole piece 60 and is thus positioned in a second position relative to contact 44, defining a second air gap therebetween which is greater than the first air gap 58 and which has a breakdown voltage much higher than that of the spark plugs. Thus, when the solenoid is energized, the high voltage is not shunted to grount and is instead supplied to the spark plugs, enabling starting of the vehicle.

It will be appreciated by persons skilled in the art that the present invention is not limited to the particular structure of the switch 24 or of other components employed herein. Rather the scope of the invention is defined only by the claims which follow.

We claim:

1. Electronic theft prevention apparatus for vehicles including an engine containing spark plugs for providing ignition, a high voltage source and a distributor having a central contact for providing high voltage distribution to the spark plugs, the apparatus including
   decoder means disposed within a protective housing enclosing the central contact;
   encoder means accessible to a vehicle operator for providing coded instructions to the decoder;
   data coupling means for interconnecting the decoder means and the encoder means to permit data transfer therebetween, whereby application of constant battery voltage to the data coupling means is not effective to operate the decoder; and
   switching means located within the protective enclosure, operated by the decoder and governing the supply of a high voltage input to the central contact, thus selectably preventing high voltage distribution to the spark plugs,
   wherein said switching means comprise means operative for selective shunting of high voltage away from the spark plugs, and wherein said means for selective shunting comprise solenoid operated means for governing the position of a shunting plunger from a first position defining a first breakdown voltage gap with respect to the high voltage supply and a second breakdown voltage gap with respect to the high voltage supply.

2. Electronic theft prevention apparatus according to claim 1 and wherein said data coupling means comprises a digital code transmission cable.

3. Electronic theft prevention apparatus according to claim 1 and wherein said preventive enclosure is secured with a lock.

4. Electronic theft prevention apparatus for vehicles including an engine containing spark plugs for providing ignition, a high voltage source and a distributor having a central contact for providing high voltage distribution to the spark plugs, the apparatus including
   decoder means disposed within a protective housing enclosing the central contact;
   encoder means accessible to a vehicle operator for providing coded instructions to the decoder;
   data coupling means for interconnecting the decoder means and the encoder means to permit data transfer therebetween, whereby application of constant battery voltage to the data coupling means is not effective to operate the decoder; and
   switching means located within the protective enclosure, operated by the decoder and governing the supply of a high voltage input to the central contact, thus selectably preventing high voltage distribution to the spark plugs, and wherein said data coupling means comprises a digital code transmission cable.

5. Electronic theft prevention apparatus according to claim 4 and wherein said preventive enclosure is secured with a lock.

6. Electronic theft prevention apparatus for vehicles including an engine containing spark plugs for providing ignition, a high voltage source and a distributor having a central contact for providing high voltage distribution to the spark plugs, the apparatus including
   decoder means disposed within a protective housing enclosing the central contact;
   encoder means accessible to a vehicle operator for providing coded instructions to the decoder;
   data coupling means for interconnecting the decoder means and the encoder means to permit data transfer therebetween, whereby application of constant battery voltage to the data coupling means is not effective to operate the decoder; and
   switching means located within the protective enclosure, operated by the decoder and governing the supply of a high voltage input to the central contact, thus selectably preventing high voltage distribution to the spark plugs,
   wherein said switching means comprise means operative for selective shunting of high voltage away from the spark plugs, and wherein said data coupling means comprises a digital code transmission cable.

7. Electronic theft prevention apparatus for vehicles including an engine containing spark plugs for providing ignition, a high voltage source and a distributor having a central contact for providing high voltage distribution to the spark plugs, the apparatus including
   decoder means disposed within a protective housing enclosing the central contact;
   encoder means accessible to a vehicle operator for providing coded instructions to the decoder;
   data coupling means for interconnecting the decoder means and the encoder means to permit data transfer therebetween, whereby application of constant battery voltage to the data coupling means is not effective to operate the decoder; and
   switching means located within the protective enclosure, operated by the decoder and governing the supply of a high voltage input to the central contact, thus selectably preventing high voltage distribution to the spark plugs, and wherein said preventive enclosure is secured with a lock.

8. Electronic theft prevention apparatus for vehicles including an engine containing spark plugs for providing ignition, a high voltage source and a distributor having a central contact for providing high voltage distribution to the spark plugs, the apparatus including
   decoder means disposed within a protective housing enclosing the central contact;

encoder means accessible to a vehicle operator for providing coded instructions to the decoder;

data coupling means for interconnecting the decoder means and the encoder means to permit data transfer therebetween, whereby application of constant battery voltage to the data coupling means is not effective to operate the decoder; and switching means located within the protective enclosure, operated by the decoder and governing the supply of a high voltage input to the central contact, thus selectably preventing high voltage distribution to the spark plugs, wherein said switching means comprise means operative for selective shunting of high voltage away from the spark plugs, and wherein said preventive enclosure is secured with a lock.

* * * * *